Aug. 30, 1966 L. W. DEEHAN ETAL 3,269,199
MOTION CONVERTING MECHANISM
Filed Oct. 15, 1963 2 Sheets-Sheet 1
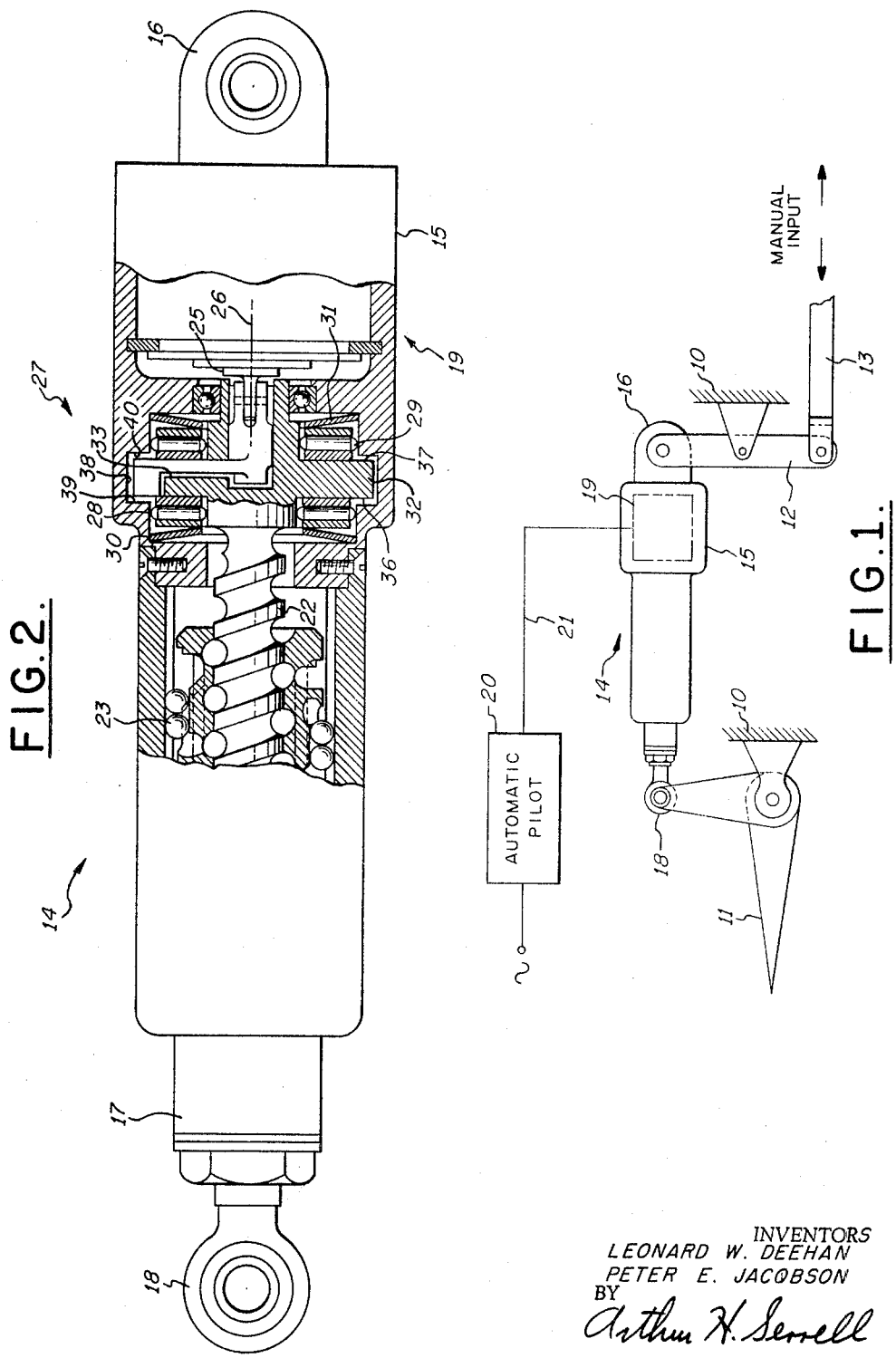
INVENTORS
LEONARD W. DEEHAN
PETER E. JACOBSON
BY
Arthur H. Serrell
ATTORNEY Aug. 30, 1966   L. W. DEEHAN ETAL   3,269,199
MOTION CONVERTING MECHANISM
Filed Oct. 15, 1963   2 Sheets-Sheet 2

INVENTORS
LEONARD W. DEEHAN
PETER E. JACOBSON
BY Arthur H. Serrell
ATTORNEY

United States Patent Office 3,269,199
Patented August 30, 1966

3,269,199
MOTION CONVERTING MECHANISM
Leonard W. Deehan, Scottsdale, and Peter E. Jacobson, Phoenix, Ariz., assignors to Sperry Rand Corporation, Great Neck, N.Y., a corporation of Delaware
Filed Oct. 15, 1963, Ser. No. 316,251
6 Claims. (Cl. 74—89)

This inventon relates to a mechanism for converting rotary to rectilinear motion. The reversible input of the mechanism is derived from a screw mounted to rotate about its longitudinal axis in a relatively stationary member. The bidirectional output of the mechanism is derived from a jack movable translationally along the axis with relation to the member depending on the sense of rotation of the screw. The mechanism further includes a means for turning the screw having a part fixedly connected to the member and an output shaft.

In accordance with the invention, a fastening of the releasable toggle type is provided between the screw and member to interlock the noted parts and thereby prevent twisting of the screw under the influence of axial loading when the turning means is ineffective. The fastening of the mechanism is released by the operation of a trip device that is connected to the output shaft of the turning means. The trip device of the mechanism is operable when the axial loading of the screw is below a determined level.

The screw is prevented from moving about its axis at and above the determined maximum loading condition by the engagement of a pair of axially spaced stops on the respective screw and member parts. The displacement of the noted parts under load along the axis is resisted by the inclusion in the structure of centering spring means that maintain a determined axial relation of the screw to the member when the load on the screw is at or below the determined level.

Thus, the principal object of the present invention is to provide a linear actuator of the low friction, lead screw type in which a first brake means is provided for restraining rotary motion of said screw due to reactive axial loads below a determined value and for providing additional brake means for restraining rotary motion of the screw due to reactive loads above or greater than the determined axial load.

As operative to convert rotary to rectilinear motion unidirectionally, the mechanism is further useful as a variable length link in a lever system with movable input and load members where the respective member and jack parts include external pivot connections. The device operates with a maximum of axial and radial backlash and transmits motion with high efficiency between its designed load limits.

Other features and further structural details of the invention will become apparent from the following description of the device in connection with the accompanying drawings in which:

FIG. 1 is a schematic view showing a portion of the elevator linkage of a combined manual and automatic servo system for aircraft in which the improved device provides a variable length link therein;

FIG. 2 is an enlarged sectional view taken vertically through the variable length link shown in FIG. 1;

Figure 3:
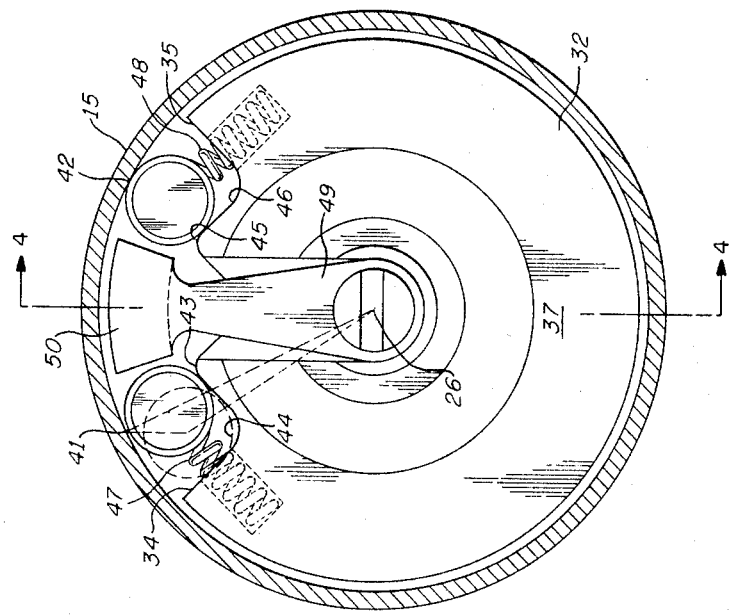
FIG. 3 is a further enlarged sectional view taken on line 3—3 in FIG. 2.

In the system of levers shown in FIG. 1, the chassis of an aircraft is indicated at 10, and the represented components include elevators 11 and a rocker 12 suitably pivoted to the chassis 10. The manual input to the system is provided by a human pilot by way of an input link or member 13 pivotally connected to one end of the rocker 12. A variable length link 14 provided by two relatively movable elements along the axis of the screw of the mechanism connects the other end of the rocker 12 to the elevators 11. A relatively stationary member 15 provides an element of the link 14 that includes an external pivot connection 16 for the rocker 12. The movable element of the link 14 is provided by a jack 17 having an external pivot connection 18 for the elevators 11. The length of the link 14 is varied in the represented system by the operation of suitable drive means shown as an electric motor 19 that is energized by the output of an automatic pilot 20 fed thereto by way of lead 21. As shown in FIG. 2, the components of the improved mechanism include the link element or stationary member 15, the translatable link element or jack 17, a screw indicated at 22 having helical ball grooves and meshing ball bearings 23 that transmit the motion of the screw to the jack 17. The driving means or motor 19 includes a stator part that is fixedly mounted on the member 15 and an output shaft 25. The shaft 25 is arranged to turn the screw about its longitudinal axis 26 by way of an interlock 27 which is effective to connect the screw 22 to the member 15 when there is no output from the automatic pilot to operate the motor 19 and the loading on the screw is in the permitted range of operation of the mechanism.

Figure 4:
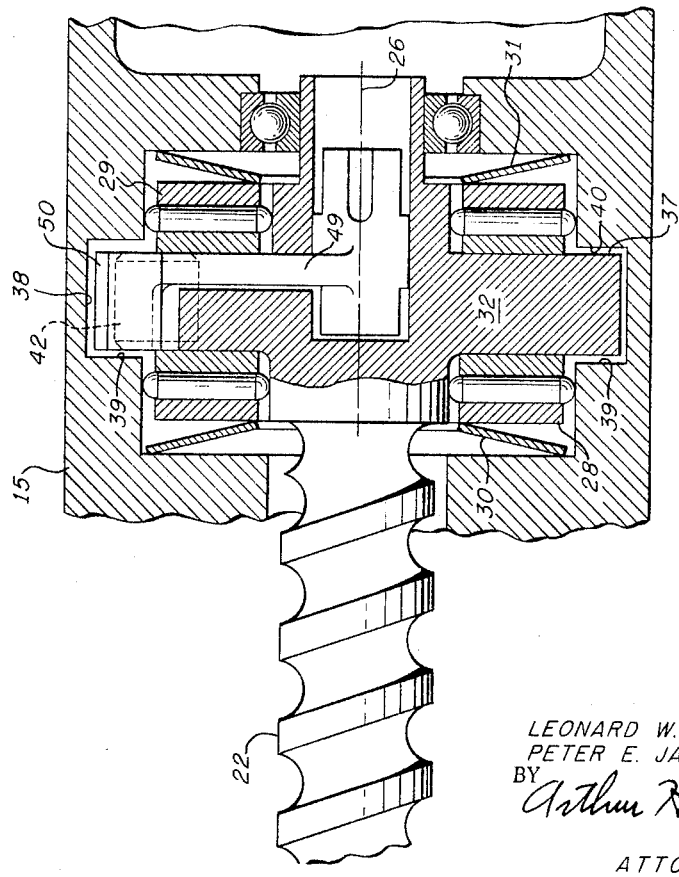
FIG. 4 is a sectional view taken on line 4—4 in FIG. 3.

As shown in FIGS. 2 and 4, the stationary member 15 includes a bearing part for a pair of axial spaced thrust bearings 28 and 29 that mount the screw 22 at its flanged end for movement about the axis 26 as well as permit a limited amount of movement along the axis 26. Spring means in the form of a pair of springs 30 and 31 between the member and screw parts determine the axial centering of the screw with relation to the member under no load conditions such as where the elevator is streamlined, there is no manual input and the output of the automatic pilot 20 is null. The flanged portion of the screw element 22 further includes a boss part 32 with a radial slot 33, a pair of oppositely disposed cam faces 34, 35 on the respective sides of the slot in the peripheral surface of the boss, and a pair of axially spaced end faces 36, 37 that cooperate with the member in limiting the axial motion of the screw for a determined maximum load condition.

The related interlock and stop structure included in the stationary member 15 is provided by an interlock sleeve part with an internal peripheral surface 38 and axially spaced faces providing stops 39 and 40. The axial spacing between the faces 36 and 37 of the screw boss part and the stops 39 and 40 of the sleeve part of the member determine the degree of axial motion permitted the screw for maximum load conditions. The screw 22 is locked to the member 15 when the cooperating limit parts are engaged against the resistive action of one of the springs 30, 31. Thus, screw 22 is locked to member 15 through an axial jam friction brake means comprising brake engage surfaces 37, 40 and 36, 39, the restraining force produced thereby inherently increasing as the axial load on screw 22 increases beyond the determined maximum load. The resistive spring is effective to restore the stop parts to a spaced condition so that the mechanism operates in a normal manner for loading conditions below the determined maximum loading.

The interlock provided between the screw 22 and member 15 is a brake of the radial expansion type, i.e., a toggle fastening of the cam and follower type, more commonly known as a roller-jam type brake. Here, the jamming cams are provided by the curved faces 34 and 35 in the boss part 32 of the screw and the cam followers are provided by respective cylindrical rollers 41 and 42 whose axes are parallel to the axis 26 of the screw. The curved cam face 34 of the fastening includes an engage area 43 and a free area 44 for the roller 41. The corresponding areas for the roller 42 on the face 35 are respectively indicated at 45 and 46. To lock the screw member, the fastening further includes a means for biasing the followers 41, 42 against the internal surface 38 of the interlock sleeve part of the member and the respective engage areas of the engage cam face areas 43, 45 as shown in FIG. 3. The biasing means provided are shown as a pair of coil springs that fit in cylindrical openings in the boss part 32 of the screw. As shown, a compressed coil spring 47 for roller 41 engages the roller at one of its ends and engages the boss part of the screw at its other end. A similarly arranged spring 48 is provided in the fastening for the cam follower 42. The described structure provides a toggle fastening that interlocks the screw and member in a load range below the permitted maximum when there is a null input to the motor 19. In the absence of an input to the motor 19, the springs 47, 48 of the provided toggle fastening exert sufficient force on the rollers 41, 42 to position the same between the engage cam face areas 43, 45 of the screw and the internal surface 38 of the sleeve part of the member and accordingly frictionally engage the parts so that the screw is locked to the member.

In accordance with the invention, the means provided to release the toggle fastening of the mechanism is provided by a trip device in the form of a crank 49 with a movable piece 50 at its end that is located between the spaced cam followers or rollers 41, 42. The crank 49 is mounted to move about the axis 26 in the slot 33 provided for the same in the screw boss part 32 through a suitable mechanical connection with the end of the shaft 25 of the motor 19. Movement of the crank 49 in either a clockwise or counterclockwise direction is dependent on the sense of the input to the motor 19 and the resultant direction of operation of the output shaft 25. With counterclockwise turning motion of the crank 49 about axis 26 as viewed in FIG. 3, the left hand end of the movable piece 50 engages the roller 41 to move it to the free area cam surface 44 against the action of the spring 47. This releases the screw 22 from the member 15 and the screw then turns with the crank 49 in a counterclockwise direction with roller 42 following the motion of the screw. The dotted line position of the roller 41 in FIG. 3 shows this element of the toggle fastening in released condition. A reverse operation occurs when the motion of the trip device is in a clockwise rather than a counterclockwise direction. Here, the end piece 50 engages the roller 42 to move it to the free area of cam surface 46 and the screw 22 released from the member 15 turns in a clockwise direction as the roller 41 follows the motion.

In the improved mechanism, the rectilinear motion of the jack 17 is dependent on the sense of operation of the screw 22 with an input to the motor 19. When the motor input is null, its output shaft 25 and the crank 49 are stationary with the screw 22 interlocked with the member 15 through the described toggle fastening of the mechanism in its designed operational loading range and for loads exceeding this range, a further torsional restraint is provided by the axially operable friction brake comprised of flange surfaces 36, 37 and inner walls 39, 40 of housing 15.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A linear actuator comprising
   (a) an elongated housing having a splined extensible member supported in at least one correspondingly splined end of said housing, said housing and member being adapted to be connected in a mechanism for moving a load and also being subject to the reactive force of the load so moved,
   (b) a low-friction lead screw connected between said housing and member for extending and retracting said member relative to said housing,
   (c) first brake means between said screw and said housing for restraining rotary motion of said screw in response to torsional forces produced through said screw by normal reactive axial loads thereon,
   (d) second brake means between said screw and said housing for restraining rotary motion of said screw in response to axial forces produced by greater than normal reactive axial loads,
   (e) spring means coupled with said second brake means for releasing the same when said axial loads are substantially normal, and
   (f) motive means coupled with said first brake means for releasing the same and for rotating said screw relative to said housing whereby to extend and retract said member relative to said housing.
2. The linear actuator as set forth in claim 1 wherein said low-friction lead screw is of the ball-screw-nut type.
3. The apparatus as set forth in claim 1 wherein said first brake means is of the roller-jam type, and wherein said second brake means is of the axial-jam type.
4. A linear actuator comprising
   (a) an elongated housing having a splined extensible member supported in at least one correspondingly splined end of said housing, said housing and member being adapted to be connected in a mechanism for moving a load and also being subject to the reactive force of the load so moved,
   (b) a low-friction lead screw connected between said housing and member for extending and retracting said member relative to said housing,
   (c) an annular channel in said housing having an inner peripheral surface and axially spaced end walls,
   (d) a flange on one end of said screw the peripheral portion thereof adapted loosely to fit within said annular channel,
   (e) a first brake means of the radially expansible type between said flange and said inner peripheral surface of said channel for restraining rotary motion between said flange and said housing in response to torsional forces produced by normal reactive axial loads on said screw connection, and
   (f) second brake means including spring means coupled between said flange and said housing for centering said flange axially between the end walls of said channel under said normal axial loads but permitting frictional engagement of said flange and one of said end walls under axial loads exceeding said normal loads whereby further to strain rotary motion of said screw relative to said housing under said excessive axial loads.
5. The linear actuator as set forth in claim 4 wherein said first brake means is a roller-jam type brake.
6. The linear actuator as set forth in claim 5 wherein said roller-jam brake means includes a crank member coupled between said ball-jam brake means and said flange for releasing said brake means, and motive means mounted in said housing and coupled with said crank means for operating said crank means and simultaneously driving said screw.

References Cited by the Examiner

UNITED STATES PATENTS

| | | | |
|---|---|---|---|
| 1,788,019 | 1/1931 | Folker | 74—424.8 X |
| 2,212,572 | 8/1940 | McCarthy et al. | 74—454.8 |
| 2,283,476 | 5/1942 | Waibel | 74—586 |
| 2,772,841 | 12/1956 | Bonsteel | 74—424.8 X |
| 2,874,579 | 2/1959 | Geyer | 74—57 |
| 3,043,552 | 7/1962 | Colautti | 192—8 X |

MILTON KAUFMAN, *Primary Examiner.*

BROUGHTON G. DURHAM, *Examiner.*

F. E. BAKER, *Assistant Examiner.*